Figure 1A:

United States Patent [19]
Andrei et al.

[11] Patent Number: 5,798,190
[45] Date of Patent: Aug. 25, 1998

[54] PROCESS FOR THE PREPARATION OF A CURRENT COLLECTOR IN CONTACT WITH THE CATHODE MATERIAL

[75] Inventors: Maria Andrei, Berceto; Federico Capuano, Rieti; Sandro Mercuri, Mentana, all of Italy

[73] Assignees: Eniricerche S.p.A., Milan; Olivetti Personal Computer S.p.A., Ivrea, both of Italy

[21] Appl. No.: 680,356

[22] Filed: Jul. 15, 1996

[30] Foreign Application Priority Data

Jul. 28, 1995 [IT] Italy ................. MI95A1650

[51] Int. Cl.$^6$ .............................. H01M 10/38
[52] U.S. Cl. ............................ 429/192; 29/623.5
[58] Field of Search ............... 29/623.5; 429/213, 429/192, 218; 252/62.2

[56] References Cited

U.S. PATENT DOCUMENTS

| | | | |
|---|---|---|---|
| 4,460,666 | 7/1984 | Dinkler et al. | 429/236 |
| 4,689,475 | 8/1987 | Kleiner et al. | 219/553 |
| 4,786,499 | 11/1988 | Slane et al. | 429/218 X |
| 4,935,317 | 6/1990 | Fauteux et al. | 29/623.5 X |
| 5,173,205 | 12/1992 | Marchese et al. | |
| 5,279,910 | 1/1994 | Sasaki et al. | 429/213 |
| 5,302,474 | 4/1994 | Shackle | 29/623.5 X |
| 5,358,801 | 10/1994 | Brodd | |

FOREIGN PATENT DOCUMENTS

| | | |
|---|---|---|
| 0 397 523 | 11/1990 | European Pat. Off. . |
| 0 638 950 | 2/1995 | European Pat. Off. . |

*Primary Examiner*—Anthony Skapars
*Attorney, Agent, or Firm*—Oblon, Spivak, McClelland, Maier & Neustadt, P.C.

[57] ABSTRACT

Process for the preparation of a current collector in contact with the cathode material in light rechargeable solid state batteries, characterized by the fact that it includes the deposition on a nickel layer having a rugosity $R_a$ from 1 to 3 microns of a cathode paste comprising 1) a powder of active cathode material;
2) an electronic conductor;
3) a polymeric composition comprising:
   3a) a polymer deriving from the polymerization of a mixture of a vinyl ether and a divinyl ether;
   3b) lithium salts, selected from $LiBF_4$ alone or in a mixture with other salts;
   3c) optionally, a plasticizer selected from dipolar aprotic solvents and polyethers with a low molecular weight and their relevant mixtures.

9 Claims, 10 Drawing Sheets

PROCESS FOR THE PREPARATION OF A CURRENT COLLECTOR IN CONTACT WITH THE CATHODE MATERIAL

The present invention concerns a process for the preparation of a current collector in contact with the cathode material in light, rechargeable, solid state batteries.

Such batteries are generally constituted by a metal anode, preferably lithium, a tonically conducting polymeric electrolyte, a cathode based upon the oxide of a transition metal and a current collector in contact with the cathode material.

The polymeric electrolyte is a ionic conducting, but non electronic polymers with a dissolved salt of an alkali metal, preferably a lithium salt. The electrolyte acts as a reservoir of lithium ions, allows the passage of the charged particles between the two electrodes and also works as an electronic separator.

In order to reduce the resistance to the passage of the charged particles, it is necessary to have a thin layer of electrolyte and/or a high ionic conductivity of the electrolyte itself. Many systems have been found as potential candidates; in particular, amorphous comb-like polymers, constituted by ethylene oxide chains bound to polymer backbones of methacrylate, phosphazene, siloxane, itaconate, vinyl ether type (U.S. Pat. No. 4,886,716), or epoxide type (U.S. Pat. No. 5,162,174), have a conductivity in the order of $10^{-5}$ S/cm at 25° C.

Metal aluminium, nickel, steel foils or metallized plastic foils are employed as current collectors. Metal nets can be adopted as well. The best performances in energetic terms of such systems are obtained when the electric contact between the cathode and the current collector is basically good.

A problem which is often faced in this type of batteries is constituted by the necessity to have a good contact between the cathode and the current collector; a bad contact, in fact, involves an increase in the global resistance and some difficulty in the recharge of the battery.

As a consequence, it is very important that the current collector and the cathode adhere to each other in an effective and uniform way.

It has now been found out a process which allows to have a very good adherence between the cathode and the current collector, in particular nickel. In this process as a composite cathode the material described in co-pending application Ser. No. 08/680,024, filed Jul. 15, 1996, and commonly owned with the present application, was employed.

In accordance with this, the present invention concerns a process for the preparation of a current collector in contact with the cathode material in light rechargeable solid state batteries, characterised by the fact that it includes the deposition on a nickel layer having a rugosity $R_a$ from 1 to 3 microns of a cathode paste comprising:

1) a powder of active cathode material, preferably $V_6O_{13}$;
2) an electronic conductors preferably carbon black;
3) a polymeric composition comprising:
   3a) a polymer deriving from the polymerisation of a mixture of a vinyl ether having general formula
   (I) $R-[-O-CH_2-CH_2-]_n-O-CH=CH_2$, where R represents a methyl or an ethyl and n is an integer comprised between 1 and 16; and a divinyl ether having general formula
   (II) $CH_2=CH-|O-CH_2-CH_2-|_m-O-CH=CH_2$ where m is an integer comprised between 1 and 10, being the molar ratio between the vinyl ether (I) and the divinyl ether (II) from 98/2 to 40/60;
   3b) lithium salts, selected from $LiBF_4$ alone or in a mixture with other salts;
   3c) optionally, a plasticizer selected from dipolar aprotic solvents and polyethers with a low molecular weight and their relevant mixtures.

The above-mentioned process is preferably followed by a step of rolling of the paste laid on the nickel collector, until one attains a cathode membrane of the desired thickness, preferably from 20 to 100 μm.

In a form of embodiment of the present invention, the nickel layer of the desired rugosity is prepared by treating a nickel foil with a mixture of strong acids, for instance $HF-HNO_3$, and then submitted to an etching treatment with plasma of argon. It will be shown in the experimental art that not all acid mixtures are equally effective in rendering the Nickel surface suited to this purpose $V_6O_{13}$ is a well known and commercially available material which can, for instance, be obtained by thermal decomposition of ammonium vadanate ($NH_4VO_3$)

Also carbon black is a commercial product, of which many types exist, such as, for instance, the Ketjen Black, the Super S. Carbon black is generally employed in a quantity ranging from 5% to 15% in weight as compared to the sum of 1+2+3.

Both $V_6O_{13}$ and carbon black must have, as is known to the experts in the branch, appropriate particle size, generally of some microns, an average diameter from 0.5 to 20 microns, approximately.

As far as the polymer is concerned, the above-mentioned polymer is prepared starting from the two monomers (I) and (II) according to one of the procedures described in EP-A-638.950.

In fact, the monomers (I) and (II), in a molar ratio from 98/2 to 40/60, are polymerized in the presence of $LiBF_4$. The latter catalyzes the polymerisation in quantities from 0.5 to 4% in weight, preferably from 1 to 2% in weight, as compared to the sum of the monomers (I) and (II).

The reaction of polymerisation is preferably carried out in the presence of a plasticizer, selected from dipolar aprotic solvents and low molecular weight polyethers and their relevant mixtures. The above-mentioned plasticizers are selected among viscous liquids with a high dielectric constant ($\epsilon$), in order to grant a high dissociation of charges. Typical plasticizers are propylene carbonate (PC), ethylene carbonate (EC), dimethyl carbonate (DMC), diethyl carbonate (DEC), γ-butyrolactone and their relevant mixtures. Another family of plasticizers are polyethers, such as, for instance, diglyme, tetraglyme and polyethers with a low molecular weights having a lower dielectric constant, but a high stability to Lithium.

The polymerisation, preferably carried out at a temperature from 10° to 40° C. (although the temperature of polymerisation does not prove binding), becomes complete in a time usually comprised between 0.5 and 10 hours, as a function of the percentage and of the ratio between the two monomers and of the lithium salt. The course of the reaction is easily monitored with an FT-IR analysis by following the disappearance of the vinyl band at 1620 $cm^{-1}$.

The polymer thus formed, eventually inglobing the plasticizer and the lithium salt, is colourless, transparent and does not drip.

As far as lithium salts are concerned, beside the $LiBF_4$, which acts both as a polymerization catalyst and as an electrolyte, other lithium salts, such as $LiCF_3SO_3$, $LiClO_4$, $LiPF_6$, $LiN(CF_3SO_2)_2$, $LiAsF_6$, can be present.

In a preferred form of embodiment, the cathode paste is prepared in two steps, the first of which consists in preparing a dispersion in a dipolar aprotic solvent, preferably acetonitrile, of $V_6O_{13}$ and carbon black. This dispersion, with a contemporary reduction of the average diameter of the particles, is prepared by contemporaryly milling the two components in the presence of the inert solvent. At the end, one obtains a dispersion whose average diameter of the $V_6O_{13}$ particles ranges from 1 to 6 µm and the average diameter of the carbon black particles ranges from 6 to 12 µm.

This dispersion is subsequently added to the previously prepared polymeric gel, and the whole is homogenized, preferably by mixing it in moving containers which contain cylinders of an inert material One provides, then, for the removal of the solvent contained in the cathode paste thus prepared by using known techniques, preferably by evaporation of the solvent. At the end of this process one obtains a cathode paste without any solvent, whose components are homogeneously dispersed, which shows a fluidity apt to be easily spread on the surface of the previously treated Nickel.

The possibility of spreading the cathode paste directly without the help of a solvent undoubtedly constitutes an improvement in the technique of prior art casting (see, for instance, EP-A-279,554), which implies the use of a solvent. The technique of casting presents some inconveniences, mainly connected with the necessity of recovering and recycling the solvent. This does necessarily implies higher investment costs and an attentive control of the conditions of temperature and evaporation velocity of the solvent, which control is necessary to obtain homogeneous surfaces.

In order to render the preparation of homogeneous layers of cathode paste having a desired thickness easier, it is preferable that a plastic material non adhesive foil (such as, for instances polyethylene or polypropylene) be applied on the cathode paste laid on the collector towards the cathode paste itself. The sandwich thus prepared (nickel-cathode paste-polythene) is then rolled at controlled thickness by using a roller. At the end of the rolling, the plastic material foil is peeled away from the cathode surface; the thickness of the layer of the cathode material laid on the Nickel collector generally ranges from 20 to 100 microns, but it is even possible to obtain, where necessary, thicknesses of more than 100 microns. The rolling of the cathode on a current collector minimizes superficial irregularities, reduces, therefore, the impedance and allows a good contact between the cathode and the collector. This also allows to reduce the thickness of the cathode and to increase its utilisation.

As far as cells are concerned, a typical cell can be assembled in the form of a thin layer, by superimposing an anode film, preferably Lithium, an electrolyte film and a cathode film, eventually laid down on a metal current collector. The lithium foil can be, for instance, rolled on a nickel foil, in order to grant the electric contact.

The "sandwich" cell configuration thus obtained is particularly flexible and can be employed for the assembly of batteries, constituted by a certain number of cells in a series and/or a parallel connection, having various forms.

The batteries can be obtained, for instance, by superimposing a certain number of elementary cells ("stack" configurations), or they can derive from the rolling of the thin layer ("rolling" configuration) or, finally, they can be obtained by folding the same thin layer ("concertina" configuration) The possibility of disposing of different types of battery configuration allows a wide applicability of the technology, which can range from the "consumer" sector (credit cards, hand cellular telephones, computers) to applications in the automotive sector.

After the assembly, the cell is generally encapsulated by heat sealing, into a plastic container constituted by two layers, an internal one and an external one, of polyethylene or polypropylene, with an interposed alluminium foil (barrier coupled).

The above-mentioned batteries attain a higher number of cycles as compared to the ones in the prior art.

For instance, in "Modern battery Technology", Editor C. D. S. Tuck, in "Applied Science and Industrial Technology", 1991 (page 550), it is stated that solid state cells (having Lithium as an anode, $V_6O_{13}$ as a cathode and polyethylene oxide +LiClO$_4$ as an electrolyte) have a cycle life of about 50–100 cycles at 20° C. On the contrary, it will be demonstrated that the cells of the present invention attain an undoubtedly higher number of cycles.

In the following examples one will refer to the following Figures.

Figure 1B:
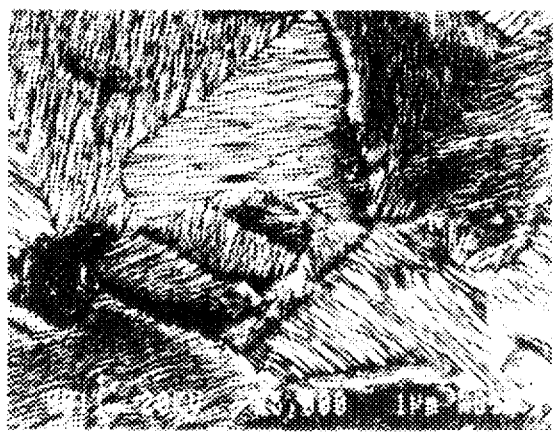
Figure 2:
Figure 3A:
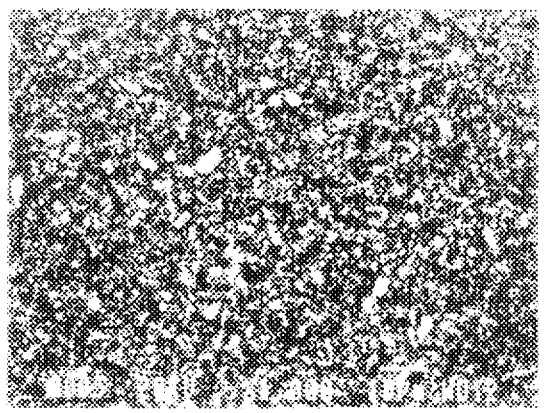
Figure 3B:
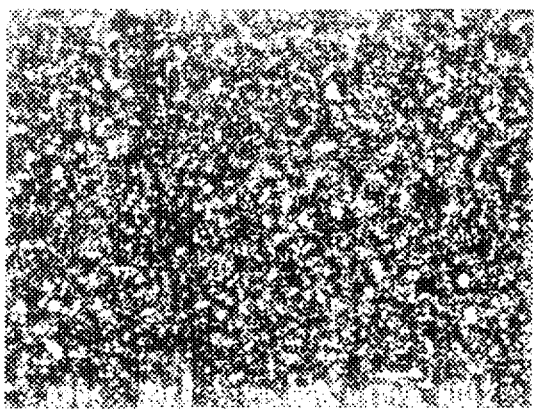
Figure 3C:
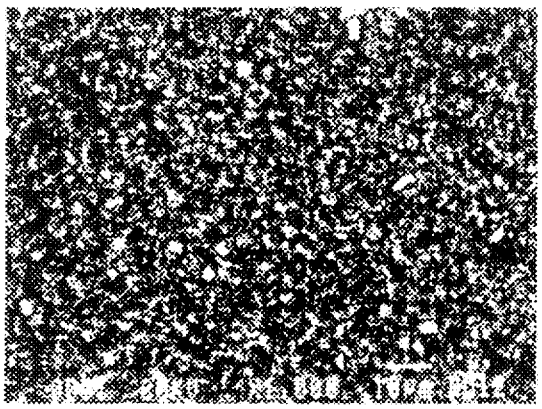
Figure 3D:
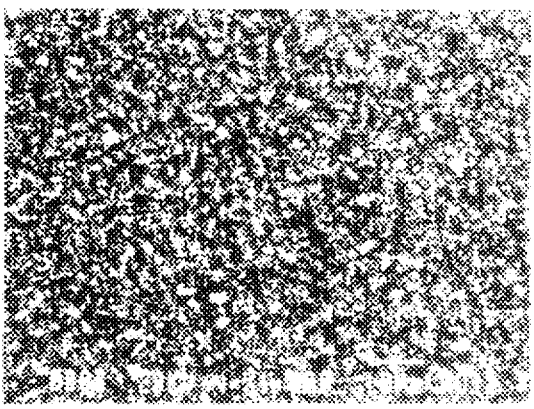
Figure 3E:
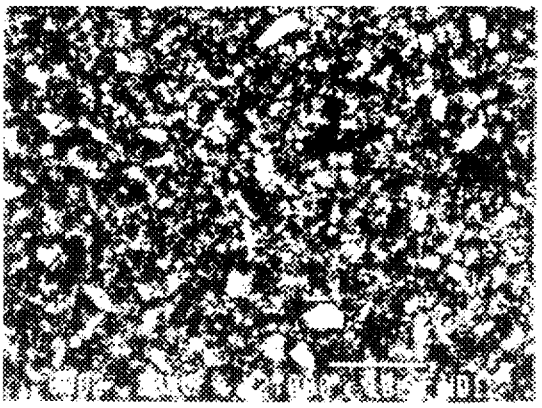
Figure 3F:
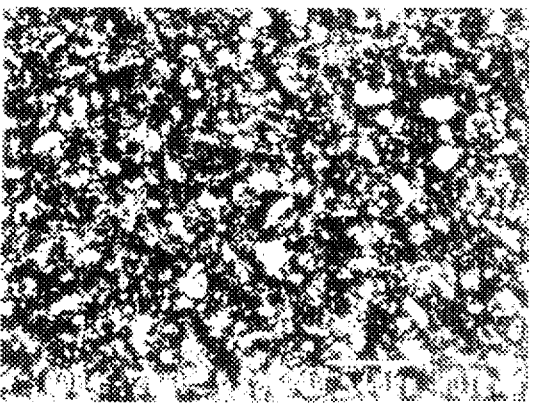
Figure 4:
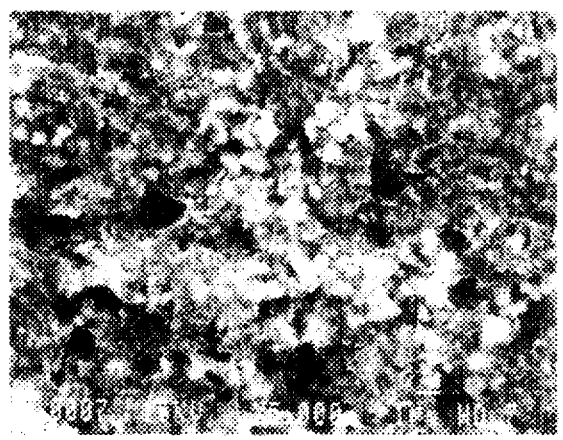
Figure 5:
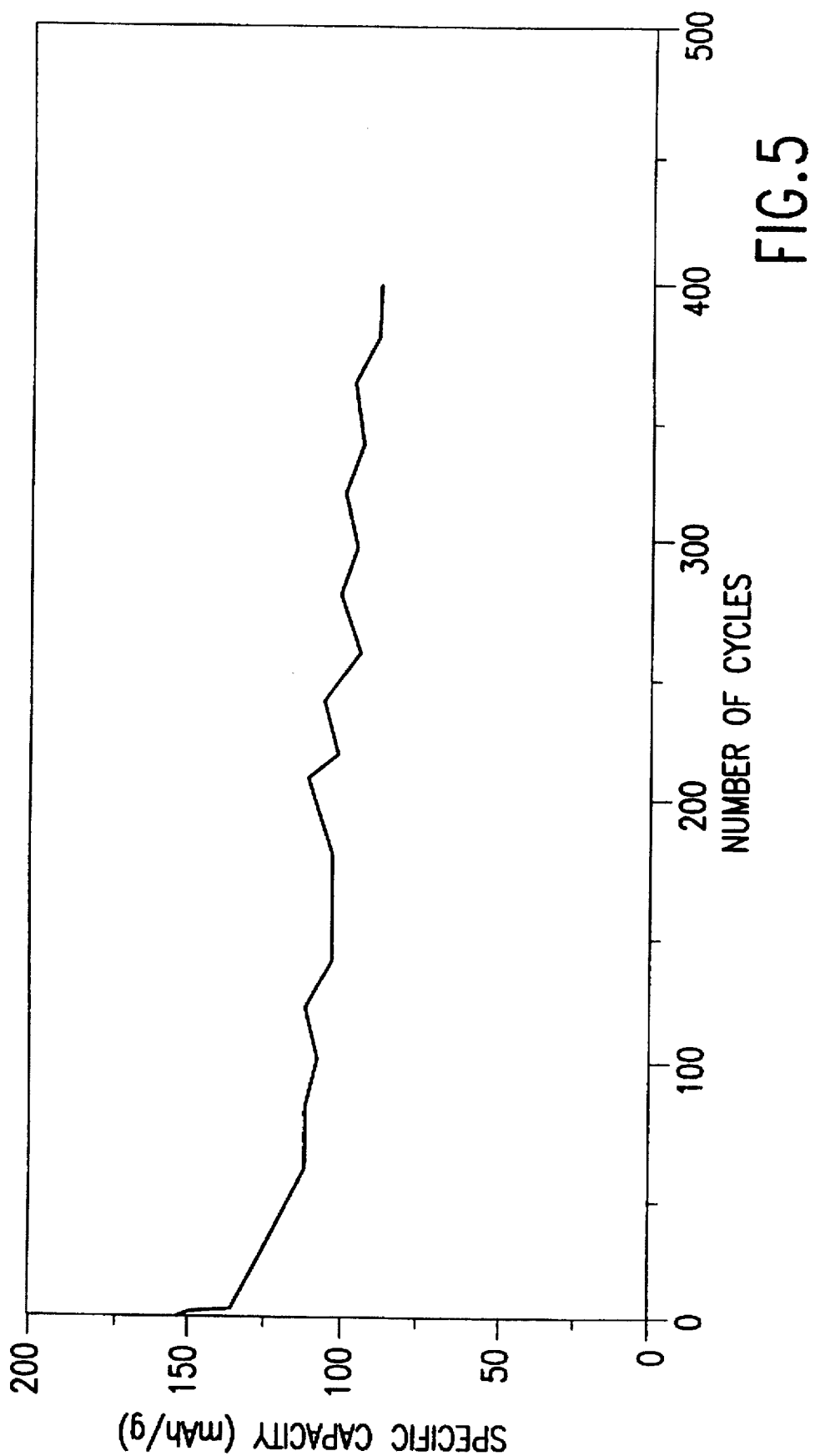
Figure 6:
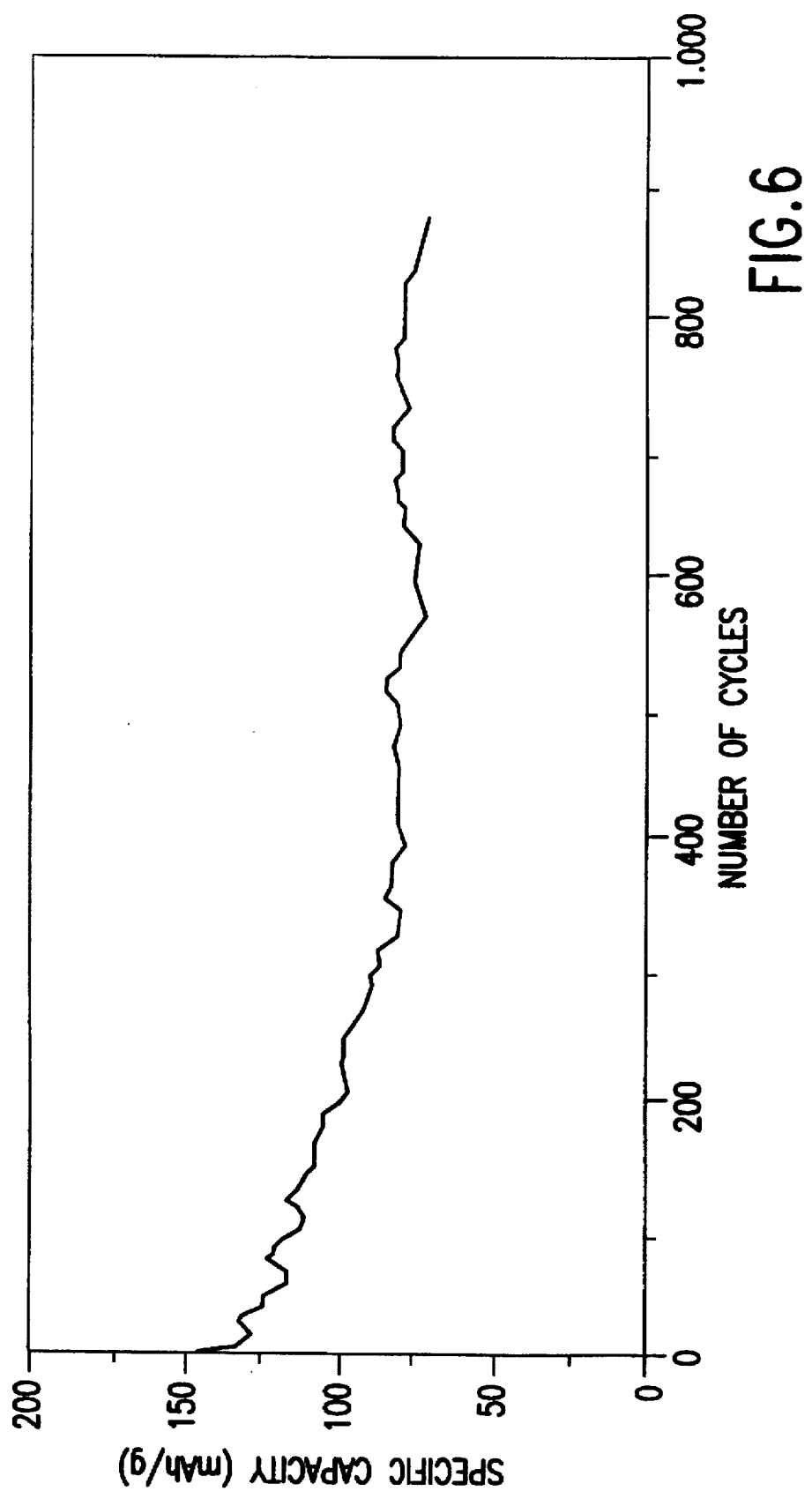
Figure 7:
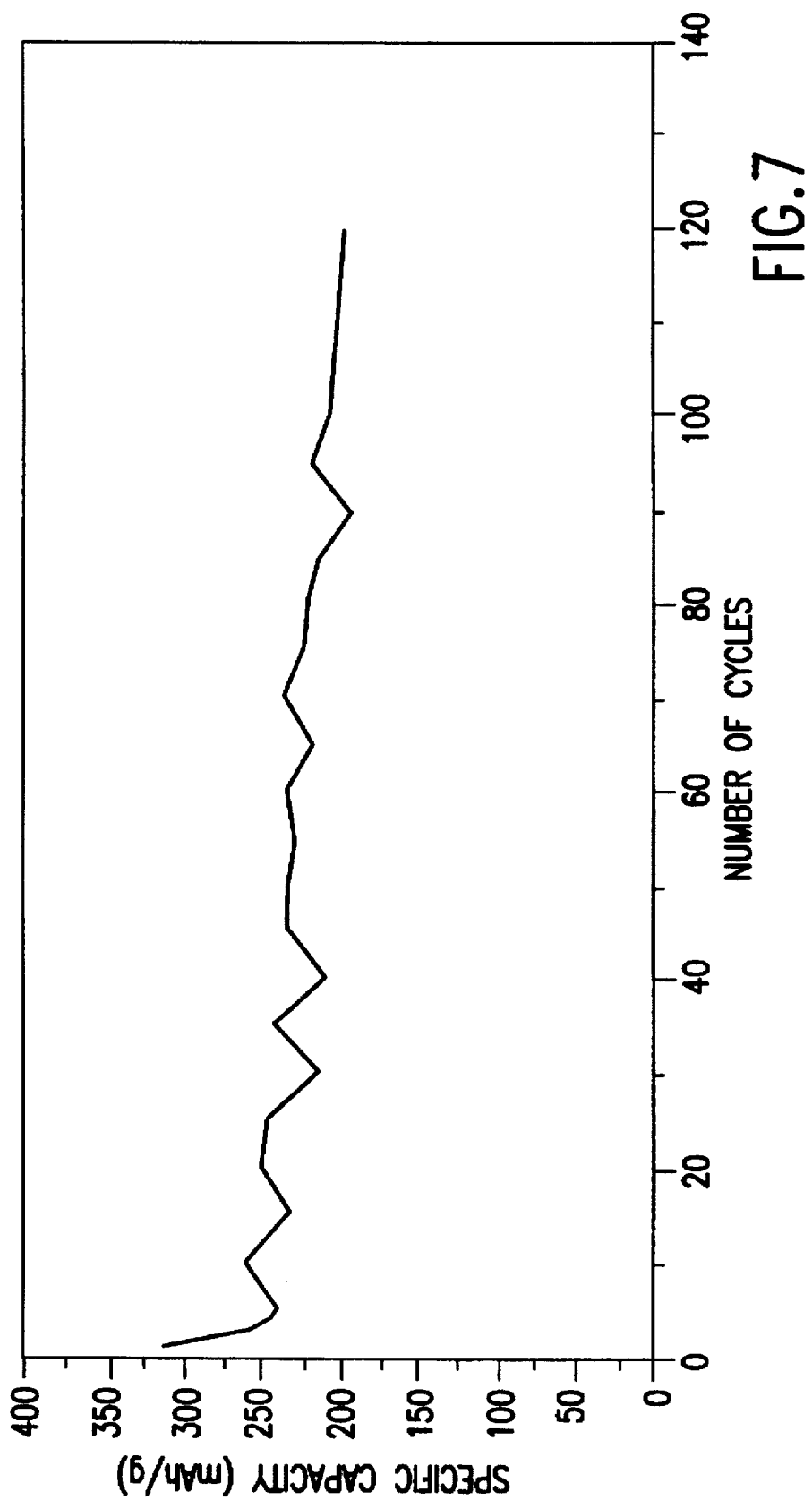
Figure 8:
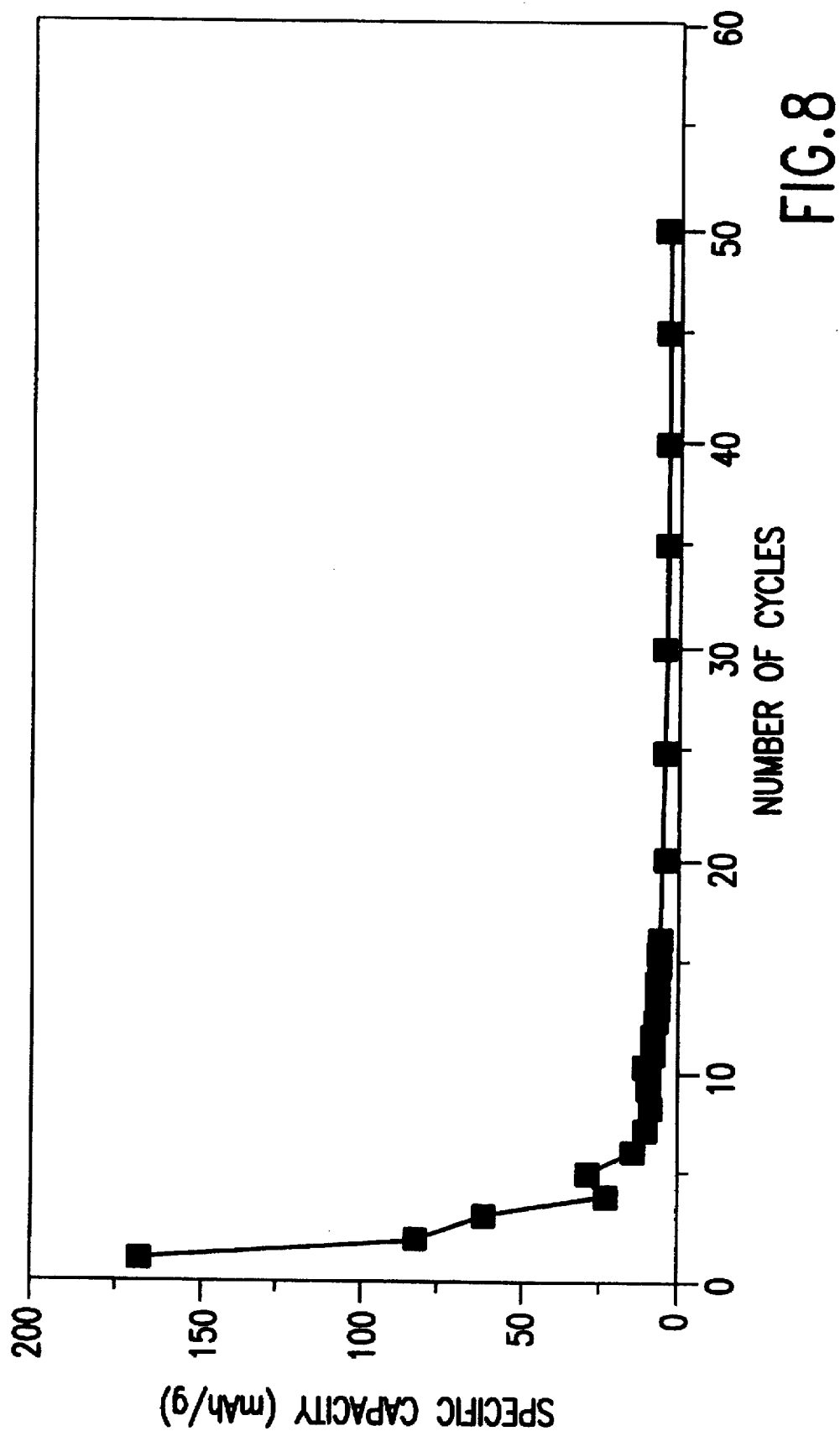
Figure 9:
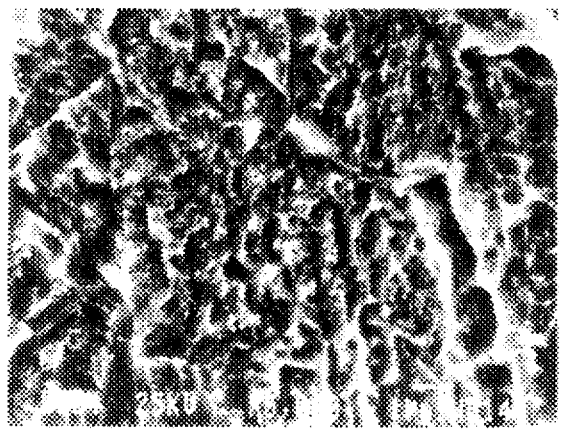
Figure 10:
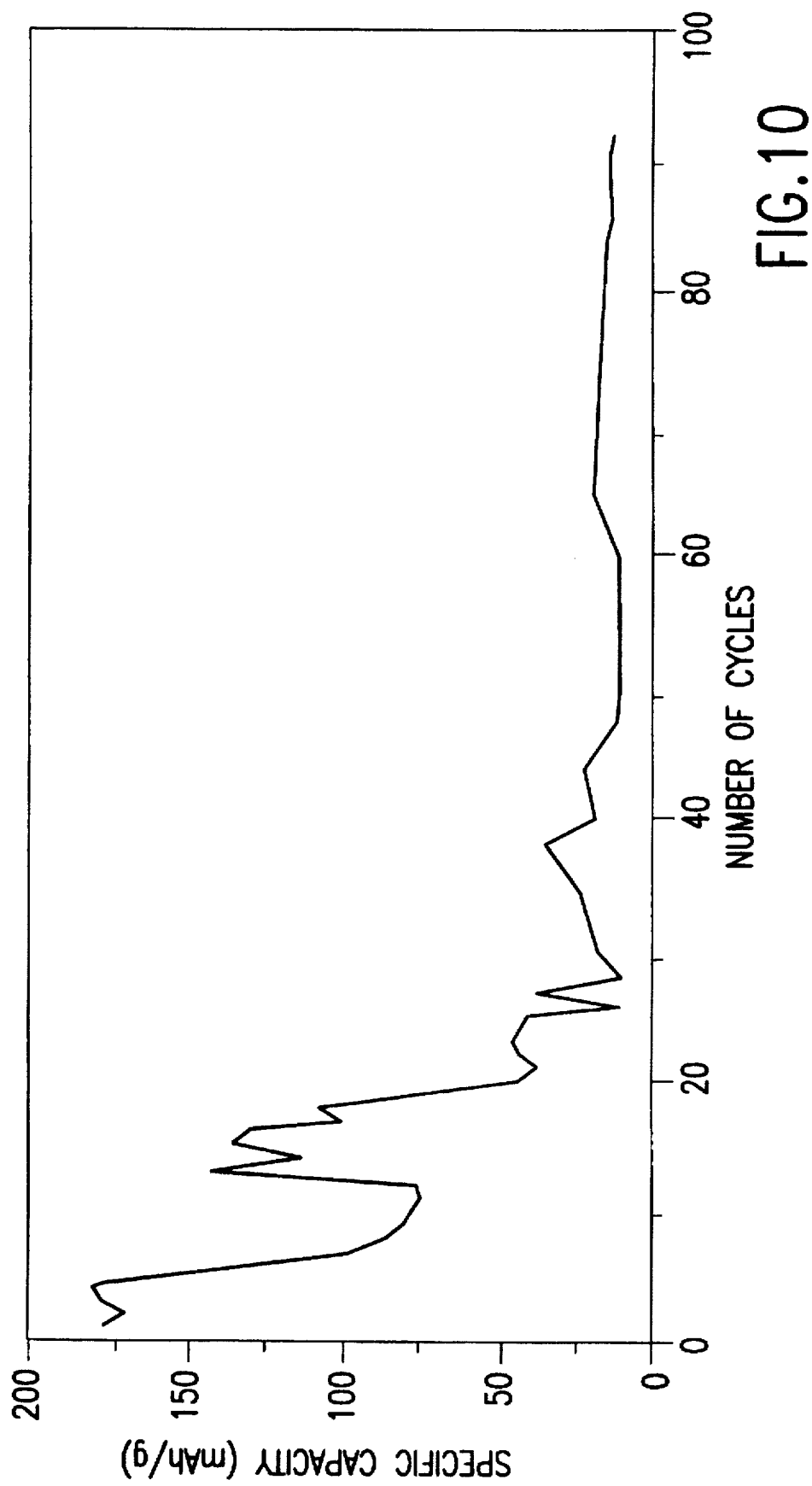

FIG. 1: Electron microscope (SEM) photographs taken on a Nickel foil after a treatment with HF/HNO$_3$ and Argon Plasma;

FIG. 2: Electron microscope (SEM) photograph taken on a non treated Nickel foil;

FIG. 3: Electron microscope (SEM) photographs taken on different points of the composite cathode obtained according to the procedure of Example 5 (61.7% $V_6O_{13}$, 9% Ketjen Black, 29.3% polymeric gel) and laid on Nickel treated according to Example 4;

FIG. 4: Electron microscope (SEM) photographs taken on a composite cathode obtained by casting;

FIG. 5: Specific capacity expressed in mAh/gr (of active cathode material $V_6O_{13}$) in the cell of example 6A, as a function of the number of cycles, cycled at a temperature of 25° C.;

FIG. 6: Specific capacity expressed in mAh/gr (of active cathode material $V_6O_{13}$) in the cell of example 6B, as a function of the number of cycles, cycled at a temperature of 25° C.;

FIG. 7. Specific capacity expressed in mAh/gr (of active cathode material $V_6O_{13}$) in the cell of example 6C, as a function of the number of cycles, cycled at a temperature of 25° C.;

FIG. 8: Specific capacity expressed in mAh/gr (of active cathode material $V_6O_{13}$) in the cell of the comparative example 7, as a function of the number of cycles, cycled at a temperature of 25° C.;

FIG. 9: Electron microscope (SEM) photograph taken on a Nickel foil after a treatement with HCl;

FIG. 10: Specific capacity expressed in mAh/gr (of active cathode material $V_6O_{13}$) in the cell of the comparative Example 8, as a function of the number of cycles, cycled at a temperature of 25° C.;

The following examples are reported for a better illustration of the present invention.

EXAMPLE 1

Preparation of the Polymeric Gel (A)

This polymeric gel is obtained by mixing MVE (triethylene glycol ethyl vinyl ether, i.e., the compound with general formula (I), where R=ethyl and n=3) (0.88 grams, 21.4% in weight), DVE (triethylene glycol divinyl ether, i.e. the compound with general formula (II), where m=3) (0.38 grams, 9.3% in weight) and the plasticizer, constituted (2.43 grams corresponding to 59.1% in weight) by a mixture 1/1 in weight of EC (ethylene carbonate) and TGME (tetraglyme), in which the two lithium salts LiCF$_3$SO$_3$ (0.34 g, 8.2% in weight) and LiBF$_4$ (84 mg, 2% in weight on the total) are dissolved.

The polymerisation and cross-linking of the system with the subsequent formation of the polymeric gel inglobing the plasticizer and the lithium salts is complete after about 6 hours

EXAMPLE 2

Preparation of the Polymeric Gel (B)

This second polymeric gel is obtained by mixing MVE (0.35 grams, 21% in weight), DVE (0.15 grams, 9% in weight) and the plasticizer, constituted by a mixture 1/1 in weight of PC (propylene carbonate) and TGME (1 gram, 60% in weight), which contains dissolved $LiBF_4$ (0.17 g, 10% in weight).

The polymerisation and cross-linking of the system with the subsequent formation of the polymeric gel inglobing the lithium salt and the plasticizer is complete after about 2 hours.

EXAMPLE 3

Preparation of the Cathode Paste

The powder of active cathode material $V_6O_{13}$ is milled in a ceramic material ball mill for about 5 hours, thus obtaining powdery particles with an average diameter of 5 microns.

After the milling, the powder is dried in a vacuum at a temperature of about 100° C. The powder of electronic conductor ("Ketjen Black" carbon back of Akzo) is treated according to an analogous process In this case the average diameter of the particles after the milling turns out to be of about 20 microns.

$V_6O_{13}$ (1.28 grams, 61.8% in weight) and carbon black (0.18 grams, 8.7% in weight) are put in a cylindric steel container together with acetonitrile (20 ml) The container is then filled with small cylinders of ceramic material, closed and agitated with a rotor for about 10 hours. The polymeric gel (0.61 grams, 29.5% in weight), described in Example 1 or 2, is added to the powder dispersion, having the aspect of a ink, and one maintains under agitation for still 3 hours. The cathode paste is recovered after the evaporation of the solvent.

EXAMPLE 4

Treatment of the Nickel Collector

A foil of Nickel (of Teledyne Rodney Metal) having a thickness of 50 microns and a surface of 8×8 cm$^2$ is submitted to a chemical-physical cleaning treatment of the surface.

The above-mentioned treatment consists in the degreasing of the surface with a hydrocarbon (hexane and/or pentane) solvent, followed by the immersion in a 50% aqueous solution of $HF-HNO_3$, in a molar ratio of 1 over 2.

The Nickel foil is kept under immersion for a period of time varying from 3 to 5 minutes, then it is repeatedly washed with some distilled water and dried in a oven at 100° C. in a vacuum This first phase allows to clean the surface by eliminating any eventual trace of superficial oxides.

The subsequent treatment of a physical type is carried out by argon plasma etching The experimental conditions of power, pressure and time adopted are the following. Power: 100–200 Watts; Pressure: 35 mbars; Time: 30–60 seconds.

At the end of the treatments the thickness of the nickel foil ranges from 30 to 40 microns, as a function of the time of permanence in the acid solution. The rugosity ($R_a$) of the nickel foil ranges from 1.2 to 1.6 microns.

FIG. 1 is the electron microscope photograph of a nickel foil at the end of the above-described process, whereas FIG. 2 is the photograph of a non treated nickel foil (rugosity $R_a$ measured with a Mitutoyo Surf Test 500 instrument, from 0.2 to 0.4 μm).

EXAMPLE 5

Deposition of the Cathode Compound on a Nickel Collector.

A certain quantity of cathode pastes obtained according to the process reported in example 3, is deposited on a nickel foil treated according to the process described in Example 4.

A foil of plastic material (such as; for instance; polyethylene or polypropylene) which has no adhesive characteristics towards the cathode paste, is then laid on the cathode paste itself The sandwich, constituted by nickel-cathode paste-polythene is then rolled at controlled thickness by using a roller. The polythene foil is then peeled away from the cathode surface In this way; one obtains a thickness of the cathode membrane of 30 μm.

FIG. 3 reports the electron microscope (SEM) photographs taken on different points of the composite cathode thus obtained and constituted for 61.7% by $V_6O_{13}$, for 9% by carbon black and for 29.3% by the polymeric gel of example 2.

These photographs show a good distribution of (white) $V_6O_{13}$ particles, which appear homogeneously dispersed inside the organic matrix (black) The dimension of the particles of $V_6O_{13}$ turns out to be comprised between 0.5 and 5 microns, with an average diameter of about 3 microns.

A SEM analysis (FIG. 4); carried out on a specimen of composite cathode, with a composition analogous to the previous ones obtained by casting, by depositing on the nickel collector (being the latter treated according to the same process as the one described in example 4) the mixture of example 3 not as it is, but dispersed in acetonitrile and after the evaporation of the solvent, is reported by comparison; it is possible to point out the presence of holes which do not contain any active material and can represent discontinuity points in the path of Li+ ions inside the cathode.

The comparison between photograph 3 and 4 clearly shows how, even in the presence of the same composite cathode, the treatement with $HF/HNO_3$ is note by itself, sufficient to grant a good adhesion between the cathode and the collector. It is, on the contrary, necessary to effect the deposition in the absence of a solvent.

EXAMPLE 6A

Assembly of an elementary cell, prepared according to the process of the present invention.

A unipolar button cell with a surface equivalent to 1 cm$^2$ is prepared by superimposing, in the order:
  a) a 1 cm$^2$ disk of cathode membrane prepared according to the procedure reported in example 3, having a thickness of 30 microns (weight 8 mg (5 mg $V_6O_{13}$)) and a capacity of 1 mAh, based upon the practical capacity of $V_6O_{13}$ of 200 mAh/gr) deposited according to the procedure of example 5 on a Nickel collector treated according to the process of the present invention illustrated in example 4;
  b) a 1 cm$^2$ disk of electrolyte membrane, obtained by following the procedure illustrated in example 1, having a thickness of 300 microns;

c) a 1 cm² Lithium disk, having a thickness of 150 microns.

In FIG. 5 the specific capacity of the above-mentioned cell, cycled at a temperature of about 25° C., obtained at a constant charge and discharge current in the course of the cycles, and, in particular:

Discharge Current=0.5 mA

Recharge (galvanostatic) Current=0.25 mA

Working voltage=2–3.2 V is reported as a function of the number of cycles.

EXAMPLE 6B

Assembly of an elementary cells prepared according to the process of the present invention.

A unipolar button cell with a surface equivalent to 1 cm² is prepared by superimposing, in the order:

a) a 1 cm² disk of cathode membrane prepared according to the procedure reported in example 3, having a thickness of 30 μm and deposited (according to the procedure of example 5) on a nickel collector treated according to the process of the present invention illustrated in Example 4. The cathode membrane, having a weight of 8.7 mg (5.3 mg $V_6O_{13}$), has a capacity of 1.06 mAh, based upon the practical capacity of $V_6O_{13}$ equivalent to 200 mAh/gr)

b) a 1 cm² disk of electrolyte membrane, obtained by following the procedure illustrated in Example 2, having a thickness of 300 μm;

c) a 1 cm² Lithium disk, having a thickness of 150 μm.

In FIG. 6 the specific capacity of the cell, cycled at a temperature of about 25° C., obtained at a constant charge and discharge current in the course of the cycles, and, in particular:

Discharge Current=0.53 mA

Recharge (galvanostatic) Current=0.265 mA

Working voltage=2–3.2 V is reported as a function of the number of cycles.

EXAMPLE 6C

Assembly of an elementary cell, prepared according to the process of the present invention.

A unipolar button cell with a surface equivalent to 1 cm² is prepared by superimposing, in the order:

a) a 1 cm² disk of cathode membrane prepared according to the procedure reported in example 5, on a nickel collector treated according to the process of the present invention illustrated in example 4. The cathode membrane, having a weight of 7.8 mg (4.7 mg $V_6O_{13}$), has a capacity of 0.95 mAh, based upon the practical capacity of $V_6O_{13}$ equivalent to 200 mAh/gr)

b) a 1 cm² disk of electrolyte membrane, obtained by following the procedure illustrated in Example 2, having a thickness of 300 μm;

c) a 1 cm² Lithium disk, having a thickness of 150 μm.

In FIG. 7 the specific capacity of the cell, cycled at a temperature of about 25° C., obtained at a constant charge and discharge current in the course of the cycles, and, in particular:

Discharge Current=0.19 mA

Recharge (galvanostatic) Current=0.12 mA

Working voltage=2–3.2 V is reported as a function of the number of cycles.

COMPARATIVE EXAMPLE 7

Assembly of an elementary cell with a non treated collector.

A unipolar button cell with a surface equivalent to 1 cm² is prepared by superimposing, in the order:

a) a disk of a cathode membrane deposited on a nickel collector treated only with a simple degreasing of the surface with hydrocarbon solvents;

b) a 1 cm² disk of electrolyte membranes obtained as shown in Example 1, having a thickness of 100 microns;

c) a 1 cm² Lithium disk, having a thickness of 150 microns.

The cathode membrane (a) has a thickness of 130 microns, a weight of 28.1 mg (17.1 mg $V_6O_{13}$, 2.6 mg carbon black, 8.4 mg polymeric gel) and a capacity of 3.4 mAh (based upon the practical capacity of $V_6O_{13}$ equivalent to 200 mAh/gr).

In FIG. 8 the specific capacity of the cell, cycled at a temperature of about 25° C., obtained at a constant charge and discharge current in the course of the cycles, and, in particular:

Discharge Current=0.1 mA

Recharge (galvanostatic) Current=0.1 mA

Working voltage=18–3.2 V is reported as a function of the number of cycles. With this type of configuration, one obtains a high specific capacity in the first cycles, with a rapid performance decay in the subsequent cycles.

In the opened and analysed cell one observes the detachment of the cathode from the collector.

COMPARATIVE EXAMPLE 8

Assembly of an elementary cell with a collector treated with HCl.

The nickel colector is degreased with hydrocarbon solvents, then immersed in a 20% HCl aqueous solution.

The nickel foil is kept under immersion for a period of time varying from 3 to 5 minutes, then it is repeatedly washed with some distilled water and dried in a oven at 100° C. in a vacuum In FIG. 9 the SEM characterisation of the surface of the collector treated with HCl is reported (Rugosity $R_a$=0.6–0.8 μm).

A unipolar button cell with a surface equivalent to 1 cm² is prepared by superimposing, in the order:

a) a 1 cm² disk of a cathode membrane deposited on a nickel collector obtained in the above-described way.

b) a 1 cm ² disk of electrolyte membranes obtained by following the procedure reported in example 1, having a thickness of 100 μm;

c) a 1 cm2 Lithium disks having a thickness of 150 μm. The cathode membrane having a thickness of 50 microns and a weight of 11 mg (6.7 mg $V_6O_{13}$, 1 mg carbon black, 3.3 mg polymeric gel) has a capacity of 1.35 mAh (based upon the practical capacity of $V_6O_{13}$ equivalent to 200 mAh/gr).

In FIG. 10 the specific capacity of the cell, cycled at a temperature of about 25° C., obtained at a constant charge and discharge current in the course of the cycles, and, in particular:

Discharge Current=0.1 mA

Recharge (galvanostatic) Current=0.08 mA

Working voltage=2–3.2 V is reported as a function of the number of cycles.

With the type of configuration described, one obtains a high specific capacity in the first cycles, with a rapid performance decay in the subsequent cycles.

We claim:

1. Process for the preparation of a current collector in contact with a cathode material comprising depositing in the absence of a solvent on a nickel layer having a rugosity $R_a$ from 1 to 3 microns, a cathode paste comprising:
   1) a powder of active cathode material;
   2) an electronic conductor;
   3) a polymeric composition consisting essentially of:
      3a) a polymer derived from the polymerisation of a mixture of a vinyl ether having general formula (I) R—(—O—CH$_2$—CH$_2$—)$_n$—O—CH=CH$_2$, where R represents a methyl or an ethyl and n is an integer between 1 and 16; and a divinyl ether having general formula (II) CH$_2$=CH—(O—CH$_2$—CH$_2$—)$_m$—O—CH=CH$_2$, where m is an integer between 1 and 10
      3b) one or more lithium salts, selected from LiBF$_4$ alone or in a mixture with other salts.

2. Process according to claim 1, wherein the nickel layer has a rugosity ranging from 1.2 to 1.6 microns.

3. Process according to claim 1, wherein the active cathode material consists essentially of V$_6$O$_{13}$.

4. Process according to claim 1, wherein the electronic conductor is carbon black.

5. Process according to claim 1, wherein the molar ratio of the vinyl ether (I) and the divinyl ether (II) ranges from 98/2 to 40/60.

6. Process according to claim 1, wherein the nickel layer is in the form of a foil having a rugosity ranging from 1 to 3 microns and is prepared by submitting a nickel foil to a treatment with a mixture of HF/HNO$_3$ and subsequent etching with plasma of Argon.

7. Process according to claim 1, additionally comprising rolling the paste deposited on the collector, until a cathode membrane having a desired thickness is obtained.

8. Process according to claim 7, wherein the cathode membrane has a thickness from 20 to 100 µm.

9. Electrochemical cell in the form of a thin layer comprising:
   a) an alkali metal anode;
   b) a ionically conducting polymeric electrolyte;
   c) a composite cathode comprising a current collector in contact with a cathode material, prepared in accordance with claim 1.

* * * * *